United States Patent
Hasegawa et al.

(10) Patent No.: US 8,019,480 B2
(45) Date of Patent: Sep. 13, 2011

(54) METHOD FOR CONTROLLING COOLED OR HEATED WATER PUMP OF AIR CONDITIONING INSTALLATION

(75) Inventors: Yuichi Hasegawa, Nilgata (JP); Hiroshi Ogawa, Murakami (JP)

(73) Assignee: Hasegawa Electric Industry Co., Ltd., Murakami-Shi (JP)

( * ) Notice: Subject to any disclaimer, the term of this patent is extended or adjusted under 35 U.S.C. 154(b) by 125 days.

(21) Appl. No.: 12/227,742

(22) PCT Filed: Mar. 28, 2007

(86) PCT No.: PCT/JP2007/000314
§ 371 (c)(1),
(2), (4) Date: May 28, 2009

(87) PCT Pub. No.: WO2007/138734
PCT Pub. Date: Dec. 6, 2007

(65) Prior Publication Data
US 2009/0319087 A1 Dec. 24, 2009

(30) Foreign Application Priority Data
May 29, 2006 (JP) .................................. 2006-147686

(51) Int. Cl.
*G05D 7/00* (2006.01)
(52) U.S. Cl. ...................................................... 700/282
(58) Field of Classification Search .................. 700/276, 700/278, 282, 299, 300
See application file for complete search history.

(56) References Cited

U.S. PATENT DOCUMENTS

| 4,245,217 A | 1/1981 | Steinhage |
| 4,321,594 A | 3/1982 | Galvin et al. |
| 4,342,987 A | 8/1982 | Rossin |
| 4,635,445 A * | 1/1987 | Otsuka et al. ................... 62/158 |

(Continued)

FOREIGN PATENT DOCUMENTS

JP    2000-111105 A    4/2000
(Continued)

OTHER PUBLICATIONS

Japanese Office Action dated Aug. 10, 2010 (and English translation thereof) in counterpart Japanese Application No. 2006-147686.

*Primary Examiner* — Albert Decady
*Assistant Examiner* — Chad Rapp
(74) *Attorney, Agent, or Firm* — Holtz, Holtz, Goodman & Chick, PC

(57) ABSTRACT

A method for controlling the operation of a cooled or heated water pump of an air conditioning installation is provided in which the flow rate of cooled or heated water is controlled to correspond to variations of energy demand on a load side unit. This can be effected by controlling on the basis of the temperature of the cooled or heated water the state of operation of a heat source, and the number of revolutions of the motor for driving the pump. When the temperature of the cooled or heated water is within a predetermined range of temperature and the operation of the heat source is halted, the motor is operated to rotate a number of revolutions N2 determined by a unit for controlling the rotation of the motor based on conditions obtained at a time of halting the operation of the heat source, until the temperature of the cooled or heated water reaches a predetermined value.

8 Claims, 1 Drawing Sheet

U.S. PATENT DOCUMENTS

| | | |
|---|---|---|
| 5,424,718 A | 6/1995 | Muller et al. |
| 5,517,830 A * | 5/1996 | Ohuchi et al. ............... 62/476 |
| 5,608,220 A | 3/1997 | Wieser et al. |
| 5,712,622 A | 1/1998 | Grossinger et al. |
| 6,822,788 B2 | 11/2004 | Blitstein |
| 2007/0144190 A1* | 6/2007 | Temmyo et al. ............ 62/180 |

FOREIGN PATENT DOCUMENTS

| | | | |
|---|---|---|---|
| JP | 2004-308950 A | | 11/2004 |
| JP | 2004-309032 A | | 11/2004 |
| JP | 2004-353986 A | | 12/2004 |
| JP | 02005345028 A | * | 12/2005 |
| JP | 2006-057991 A | | 3/2006 |

* cited by examiner

[Fig. 1]
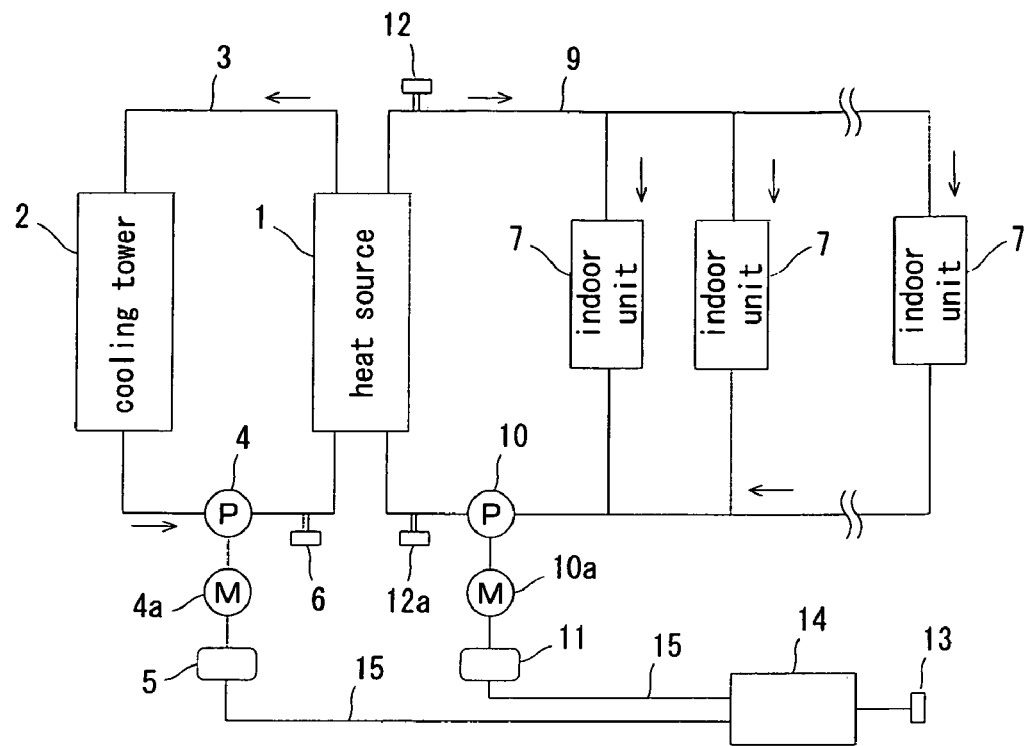
[Fig. 2]
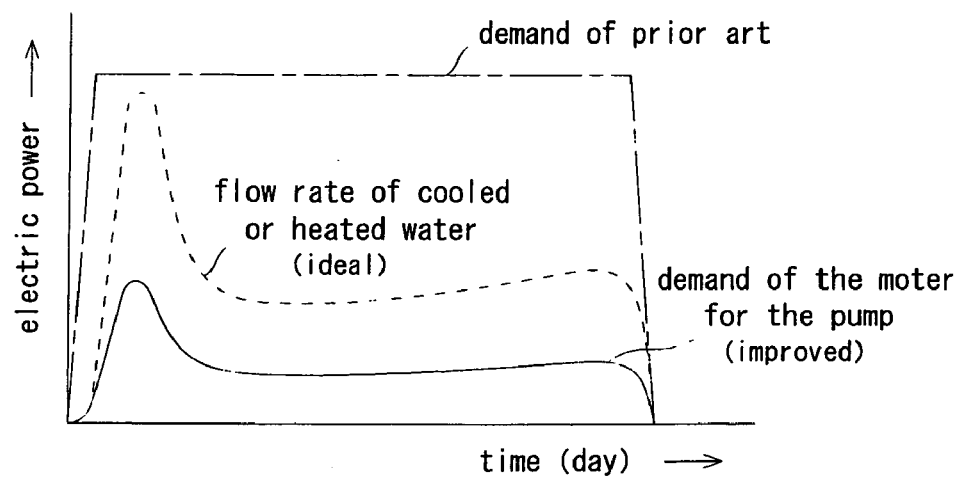

METHOD FOR CONTROLLING COOLED OR HEATED WATER PUMP OF AIR CONDITIONING INSTALLATION

This application is a U.S. National Phase Application under 35 USC 371 of International Application PCT/JP2007/000314 filed Mar. 28, 2007.

FIELD OF THE INVENTION

The present invention relates generally to a central air conditioning installation of an enclosed type in which the air conditioning can be effected by the circulation of a cooled or heated water, and more particularly, the present invention relates to a method for controlling the state of operation of the cooled or heated water pump included in the installation.

BACKGROUND OF THE INVENTION

In the central air conditioning installation of the enclosed type, the temperature control of an atmosphere of the room to be conditioned may be effected by circulating the water cooled or heated by the heat source such as for example a refrigerator by means of the water pump to the indoor units (the load-side air conditioning facilities), and making heat exchange between the cooled or heated water flowing through the fan coil unit of the indoor unit and the air within the room to be conditioned (see: the patent document 1 cited herein below).

1. Japanese laid-open public disclosure No. 2000-111105 (see: P 1-5, and FIGS. 1-3)

DISCLOSURE OF THE INVENTION

Problem or Problems to be Solved by the Invention

In the central air conditioning installation of the prior art, the heat source is adapted to be controlled to repeatedly deliver and stop the heat or cool energy for keeping the temperature of the water circulating between the heat source and the indoor unit or units substantially constant. When the heat exchanging is effected between the cooled or heated water flowing through the unit and the air in the room to be conditioned and the temperature of the water departs from the set range of temperature, the heat or cool energy must be delivered to the water to restore the temperature thereof. The energy delivering condition continues until the temperature of the water reaches the opposite limit of the set range, i.e. when the installation is in the room heating mode of operation, the upper limit of the range, and on the contrary, when the installation is in the room cooling mode of operation, the lower limit of the range. Upon the temperature of the water depart the range again through the opposite limit, the heat source is controlled to stop the delivering of the heat or cool energy.

In the situation, the circulation of the water is maintained so that the heat exchanging operation between the water and the air within the room to be conditioned.

In the case that the temperature of the water deviates from the set range of temperature due to the consumption of energy on the side of the load, it must be required to supply the heat or cool energy to recover the temperature of the water. This constantly carried out during the air conditioning operation. Thus the heat source may be controlled in dependence on the consumption of energy on the side of the load.

However, the water pump for circulating the cooled or heated water into and out of the indoor units may constantly be operated so as to maintain a predetermined amount of water is supplied during working the air conditioning installation, in spite of the fact that the amount of energy supplied by the heat source corresponds substantially with the energy consumption on the side of the load. In other words, the motor for driving the pump consumes electric power in vain.

In determining the motor for driving the water pump, it is common to adopt the motor of the capacity of 120% of the driving capacity required for the stationary operation, i.e. the motor having 20% surplus capacity. Further, it is general to drive the motor always in its maximum capacity. Thus the presence of the surplus capacity will also increase the wasteful consumption of electric power.

In accordance with the present invention, a method for controlling the state of operation of the cooled or heated water pump included in the air conditioning installation and thus reducing or eliminating the wasteful demand of the driving motor by controlling not only the operating condition of the heat source but also the number of revolution of the motor for driving the water pump can be provided.

BRIEF SUMMARY OF THE INVENTION

In accordance with the invention, a method for controlling a cooled or heated water pump of an air conditioning installation is provided. In the method of the invention, when the heat source is operated in room cooling or heating mode to bring the temperature of the water within the predetermined range of temperature, a motor for driving the pump for delivering the cooled or heated water from the heat source into indoor unit or units is operated in the number of revolution N1 initialized by a means for controlling the rotation of the motor;

and when the temperature of the cooled or heated water is within the predetermined range of temperature and the operation of the heat source is halted, the motor for driving the pump for delivering the cooled or heated water is operated in the number of revolution N2 deduced by the means for controlling the rotation of the motor from any conditions obtained at the time of halting the operation of the heat source until the temperature of the cooled or heated water reaches the predetermined value P1 of temperature.

Further, the means for controlling the number of revolution can be an inverter.

In concretely, the present invention relates to a method for controlling the operation of the pump for delivering a cooled or heated water to an air conditioning installation, wherein the motor for driving the pump is operated at the number of revolution N1 calculated from any conditions such as the variation of the temperature of the water and the outdoor temperature, when the heat source supplies through the heat transfer medium such as water the heat or cryogenic energy to the air conditioning unit or units provided on the load side of the heat source, in order to provide more water than that required for assuring the minimum amount of flow rate for the proper operation of the heat source; and wherein upon the heat source stopped to deliver the heat or cryogenic energy through the heat transfer medium such as water to the load side unit or units, the operation of the heat source is halted, the interlinking sequence between the heat source and the pump is disengaged, and the motor for driving the pump is operated at the number of revolution N2 calculated from any conditions such as the variation of the temperature of the water and the outdoor temperature until the temperature of the water reaches the temperature limit for the proper operation of the load side unit or units.

Further, the one of the conditions under which the number of revolution N2 is decided is the temperature data obtained from the temperature differential between the temperature detected by the first temperature sensor provided on the outflow side of a cooled or heated water line and the temperature detected by the second temperature sensor provided on the inflow side of the line.

EFFECT TO BE OBTAINED FROM THE INVENTION

In accordance with the method for controlling the operation of the pump for delivering a cooled or heated water as a heat transfer medium of the air conditioning installation, the number of revolution of the water pump can be controlled to the mode of operation of the heat source, i.e. the heat energy supplying mode or the cryogenic energy supplying mode. During the heat energy or cryogenic energy is supplied from the heat source to bring the temperature of the water within the predetermined range, the motor of the pump is controlled by the inverter to decrease the number of revolution to provide the flow rate above the minimum value for the proper operation of the heat source, and the minimum flow rate satisfies the required energy consumption on the load side. When the heat energy or cryogenic energy supplied from the heat source to the load side unit or units through the cooled or heated water, i.e. the heat transfer medium is stopped the operation of the heat source may also be stopped and the interlinking sequence between the heat source and the pump is disengaged, and the motor for driving the pump is decreased to the value calculated from any conditions such as the variation of the temperature of the water and the outdoor temperature until the temperature of the water reaches the temperature limit for the proper operation of the load side unit or units. In conclusion, the demand of the motor for driving the pump can substantially be reduced.

The number of revolution of the motor when the supplying of the heat energy or cryogenic energy from the heat source is stopped can be calculated on the basis of the difference between the temperature detected by means of the first temperature sensor provided on the outflow side of the line through which the cooled of heated water can be delivered and that detected by means of the second temperature sensor provided on the inflow side of the line. Thus the number of sensors required for collecting data can be reduced so that the number of revolution of the motor of the pump can be controlled through some simple logic.

BRIEF DESCRIPTION OF THE DRAWINGS

Embodiments of the present invention will now be described more fully with reference to the accompanying drawings in which:

FIG. 1 is a schematic diagram illustrating an embodiment of the central air conditioning installation of enclosed type to which the method of the present invention can be applied for controlling the operation of the cooled or heated water pump; and FIG. 2 is a graph illustrating the concrete example of the variation of the demand of the water pump upon heating.

DETAILED DESCRIPTION OF THE INVENTION

The best mode for carrying out the method of the present invention for controlling the operation of the cooled or heated water pump of the air conditioning installation will now be described with reference to the attached drawings.

In FIG. 1, an arrangement of the central air conditioning installation of enclosed type to be operated in accordance with the method of the present invention for controlling the operation of the cooled or heated water pump. In FIG. 1, the reference numeral 1 is added to a heat source for adjusting (increasing or decreasing) the temperature of the water to be cooled or heated i.e. the heat transfer medium, the reference numeral 2 is added to a cooling tower for cooling the medium circling within the coolant line 3 through the contact with the atmosphere, the reference numeral 3 is added to the coolant line for circulating the coolant between the heat source 1 and the cooling tower 2, the reference numeral 4 is added to a coolant pump for delivering the coolant within the line 3, the reference numeral 4a is added to a motor for driving the coolant pump 4, the reference numeral 5 is added to an inverter for adjusting the number of revolution of the motor 4a per unit time, and the reference numeral 6 is added to a medium temperature sensor for measuring the temperature of the coolant within the line 3.

Can also be used as the heat source 1 is, for example, the refrigerator of heat pump type that can be used not only as a heater but also as a cooler, or the combination of the refrigerator dedicated for cooling and the heating equipment such as a boiler.

Further, the reference numeral 7 is added to indoor units for conditioning the air within the rooms to be conditioned, the reference numeral 9 is added to the cooled or heated water line circulating the water or the heat transfer medium between the heat source 1 and the indoor units 7, the reference numeral 10 is added to a pump for circulating the heat transfer medium within the line 9, the reference numeral 10a is added to a motor for driving the pump 10, the reference numeral 11 is added to an inverter for adjusting the number of revolution per unit time, the reference numeral 12 is added to the first temperature sensor for measuring the temperature of the water within the line 9 to be delivered into the heat source, and the reference numeral 12a is added to the second temperature sensor for measuring the temperature of the water within the line 9 delivered from the heat source.

The reference numeral 13 is added to an outdoor temperature sensor, the reference numeral 14 is added to a control panel (control device) for controlling the operation of the air conditioning installation, and the reference numeral 15 is added to a control cable.

The operation of the pump 10 in accordance with the operation control sequence of the present invention will now be described in both of the room heating and cooling modes of operation.

The Room Heating Mode of Operation

Upon issued the operation commencing command from the control panel 14 (control device) through pushing manually the start button provided on the control panel 14 or through the operation of the timer (not shown) in a predetermined sequence, the heat source 1 and the motor 10a of the pump 10 start their operation. The number or revolution N1 of the motor 10a of the pump 10 is adapted to be controlled by the inverter 11.

The above mentioned number of revolution N1 is defined as a number of revolution ranged between the number of revolution for ensuring the minimum amount of water for the normal or proper operation of the heat source 1 and the rated number of revolution of the pump 10. The number of revolution N1 can be calculated with taking the outdoor temperature (measured by means of the outdoor temperature sensor 13) and the heat loss of the building in which the rooms to be conditioned into consideration.

In this room heating mode of operation, when the temperature of the cooled or heated water flowing through the line 9 detected by the second temperature sensor 12a is below the lower limit of the predetermined range of temperature, the water heating operation through the heat source 1 is continued.

Upon reaching the temperature of the water flowing through the line 9 to the upper limit of the predetermined range of temperature, the operation halting command is issued to stop the operation of the heat source 1, and the operation of the pump 10 is also stopped. Actually, the operation of the heat source 1 will be stopped after the predetermined time period (diluting time).

Upon detecting the halting of the heating operation of the heat source 1, the control panel 14 (control device) issues the operation commencing command to the motor 10a of the pump 10, and indexing the number of revolution N2 to the inverter 11 of the motor 10a of the pump 10.

This number of revolution N2 is that assuring the minimum flow rate for operating the indoor units 7 (load-side air conditioning facilities) normally. The number of revolution N2 can be calculated with taking any conditions such as the outdoor temperature (measured by means of the outdoor temperature sensor 13) and the heat loss of the building to be conditioned into consideration.

The control panel 14 (control device) is adapted to provide the operation halting command to the motor 10a of the pump 10 when the temperature of the water flowing through the outflow side of the line 9 measured by means of the sensor 12 reaches the predetermined value P1.

The predetermined value P1 of the water is defined as that lower than the temperature at which the heating operation of the heat source 1 is to be commenced, and that assuring the normal operation of the indoor units 7 (load-side air conditioning facilities). The value P1 can be calculated with taking any conditions such as the outdoor temperature (measured by means of the outdoor temperature sensor 13) and the heat loss of the building to be conditioned into consideration.

Upon finished the operation, the heating operation halting command is issued to the heat source 1 through pushing manually the stop button provided on the control panel 14 or through the control command for finishing the operation provided by the operation of the timer. In the case that the heat source 1 is still operated upon finished the operation, the heating operation must be stopped after the predetermined time period (dilution time), and then the operation of the pump 10 is stopped.

On the contrary, in the case that the predetermined time period had elapsed after the last operation of the heat source 1, the pump 10 can be stopped immediately.

The Room Cooling Mode of Operation

Upon issued the operation commencing command from the control panel 14 (control device) through pushing manually the start button provided on the control panel 14 or through the operation of the timer (not shown) in a predetermined sequence, the heat source 1 and the motor 10a of the pump 10 start their operation. The number of revolution N1' of the motor 10a of the pump 10 is adapted to be indexed by the inverter 11.

The number of revolution N1' is defined between that assuring the minimum flow rate of water or medium required for the proper operation of the heat source and that established as the rated number of revolution of the pump 10. The value of N1' can be calculated with taking any conditions such as the outdoor temperature (measured by means of the outdoor temperature sensor 13) and the heat loss of the building to be conditioned into consideration.

When the temperature of the water flowing through the line 9 is above the set range of the temperature, the heat source 1 begins its operation to cool the water flowing therethrough.

When the temperature of the cooled or heated water flowing through the line 9 reached the lower limit of the set temperature range, the cooling operation halting command is issued, and the pump stops its operation. The heat source 1 will stop cooling the water after the lapse of the predetermined time period (dilution time).

When the termination of the cooling operation of the heat source 1 is detected, the control panel 14 (control device) issues the operation commencing command to the motor 10a of the pump 10. The number of revolution N2' is also issued to the inverter 11 of the motor 10a of the pump 10.

The number of revolution N2' is defined as that assuring the minimum flow rate of water or medium required for the proper operation of the indoor units 7 (load-side air conditioning facilities). The value of N2' can be calculated with taking any conditions such as the outdoor temperature (measured by means of the outdoor temperature sensor 13) and the heat loss of the building to be conditioned into consideration.

The control panel 14 (control device) is adapted to provide the operation halting command to the motor 10a of the pump 10 when the temperature of the water flowing through the outflow side of the line 9 measured by means of the sensor 12 descended to the predetermined value P1'.

The predetermined value P1' of the cooled or heated water is that greater than the temperature at which the cooling operation of the heat source 1 is to be commenced. The value of P1' can be calculated with taking any conditions such as the outdoor temperature (measured by means of the outdoor temperature sensor 13) and the heat loss of the building to be conditioned into consideration.

Upon issued the operation halting command to the heat source 1 through pushing manually the start button provided on the control panel 14 or through the operation of the timer (not shown) in a predetermined sequence, the heat source 1 and the motor 10a of the pump 10 terminate their operation. Should the heat source 1 be still in a cooled condition, the heat source is left as it is for a predetermined time period (dilution time), and then the pump 10 will be stopped after finished the cooling operation.

When the cooling operation had stopped and the above-mentioned predetermined time period had lapse, the pump 10 can be stopped immediately.

In the room heating or cooling operation as described above, each indoor unit 7 (load-side air conditioning facilities) can be controlled automatically by the control device inherent. The indoor unit 7 can also be controlled manually.

The above-mentioned values of number of revolution such as N1 and N2, or N1' and N2' can be calculated through PLC (programmable logic controller).

The demand of the motor controlled under the inverter can be designated as follows;

$$[\text{the demand}]=[\text{the rated power of the motor}]\times[1-(\text{controlled number of revolution/the rated number of revolution})^3] \quad (1)$$

In this connection, the reduction of the flow rate to ½ will reduce the demand to ⅛, and the reduction of the flow rate to ¼ will reduce the demand to 1/64.

The variation of the demand of the motor for the water pump upon heating is designated in FIG. 2. As can be seen from FIG. 2, the required energy demand of the load side is proportional to the flow rate of the water. When the flow rate of the water should follow the dotted line shown in FIG. 2 as the flow rate of the cooled or heated water (the ideal flow rate), the required demand calculated by the above cited equation (1) will follow the solid line as shown in FIG. 2. Thus, the required demand can be reduced substantially relative to the demand of the prior art shown in FIG. 2 as a phantom line. In accordance with the experimentation, the demand can be reduced 95%.

EXPLANATION OF THE REFERENCE NUMERALS

1 heat source
2 cooling tower
3 cooled water line
4 cooled water pump
4a motor
5 inverter
6 temperature sensor
7 indoor unit
9 cooled or heated water line
10 cooled or heated water pump
10a motor
11 inverter
12 first temperature sensor
12a second temperature sensor
13 outdoor temperature sensor
14 control panel
15 cable

The invention claimed is:

1. A method for controlling a cooled or heated water pump of an air conditioning installation, comprising:
   upon operation of a heat source of the air conditioning installation in a room cooling or heating mode to bring a temperature of water used in the air conditioning installation within a predetermined range of temperature, operating a motor, which drives the pump to deliver cooled or heated water from the heat source into an indoor unit, to rotate a number of revolutions N1 initialized by means for controlling rotation of the motor; and
   when the temperature of the cooled or heated water is within the predetermined range of temperature and the operation of the heat source is halted, operating the motor to rotate a number of revolutions N2 until the temperature of the cooled or heated water reaches a predetermined value P1,
   wherein the number of revolutions N2 is determined by the means for controlling the rotation of the motor based on at least one condition obtained at a time of halting the operation of the heat source.

2. The method as claimed in claim 1, wherein the means for controlling the rotation comprises an inverter.

3. The method as claimed in claim 1, wherein the at least one condition based on which the number of revolutions N2 is determined comprises temperature data obtained from a temperature differential between a temperature detected by a first temperature sensor provided on an outflow side of a cooled or heated water line and a temperature detected by a second temperature sensor provided on an inflow side of the line.

4. The method as claimed in claim 2, wherein the at least one condition based on which the number of revolutions N2 is determined comprises temperature data obtained from a temperature differential between a temperature detected by a first temperature sensor provided on an outflow side of a cooled or heated water line and a temperature detected by a second temperature sensor provided on an inflow side of the line.

5. A method for controlling a cooled or heated water pump of an air condition installation, comprising:
   when a temperature of cooled or heated water used in the air condition installation is within a predetermined range of temperature and operation of a heat source of the air condition installation is halted, disengaging an interlinking sequence between the heat source and the pump, and operating a motor for driving the pump to rotate a number of revolutions N2 until the temperature of the water reaches a temperature limit for proper operation of a load side unit of the air condition installation,
   wherein the number of revolutions N2 is calculated based on at least one of conditions comprising a variation of the temperature of the water and an outdoor temperature.

6. The method as claimed in claim 5, wherein the means for controlling the rotation comprises an inverter.

7. The method as claimed in claim 5, wherein the at least one of conditions based on which the number of revolutions N2 is determined comprises temperature data obtained from a temperature differential between a temperature detected by a first temperature sensor provided on an outflow side of a cooled or heated water line and a temperature detected by a second temperature sensor provided on an inflow side of the line.

8. The method as claimed in claim 6, wherein the at least one of conditions based on which the number of revolutions N2 is determined comprises temperature data obtained from a temperature differential between a temperature detected by a first temperature sensor provided on an outflow side of a cooled or heated water line and a temperature detected by a second temperature sensor provided on an inflow side of the line.

* * * * *

UNITED STATES PATENT AND TRADEMARK OFFICE
CERTIFICATE OF CORRECTION

PATENT NO. : 8,019,480 B2  
APPLICATION NO. : 12/227742  
DATED : September 13, 2011  
INVENTOR(S) : Yuichi Hasegawa Page 1 of 1

It is certified that error appears in the above-identified patent and that said Letters Patent is hereby corrected as shown below:

On the Title page:

Under Item (75) Inventors;

change "Nilgata (JP)" to --Niigata-shi (JP)-- and "Murakami (JP)" to --Murakami-shi (JP)--.

On the Title page:

Item (56) References Cited under U.S. PATENT DOCUMENTS;

delete "U.S. Patent No. 4,245,217

Signed and Sealed this  
Nineteenth Day of March, 2013

Teresa Stanek Rea  
*Acting Director of the United States Patent and Trademark Office*